United States Patent
Ju (10) Patent No.: US 6,805,277 B1
(45) Date of Patent: Oct. 19, 2004

(54) PROCESS FOR SOLDERING ELECTRIC CONNECTOR ONTO CIRCUIT BOARD

(75) Inventor: Ted Ju, Keelung (TW)

(73) Assignee: Lotes Co., Ltd., Keeling (TW)

( * ) Notice: Subject to any disclaimer, the term of this patent is extended or adjusted under 35 U.S.C. 154(b) by 40 days.

(21) Appl. No.: 10/414,198

(22) Filed: Apr. 16, 2003

(51) Int. Cl.[7] .................. B23K 31/00; B23K 31/02; B21D 39/00
(52) U.S. Cl. .................. 228/180.21; 228/173.3; 228/173.5
(58) Field of Search .................. 228/141.1, 164, 228/173.3, 173.5, 180.1, 180.21, 189, 245, 248.1, 253; 438/26, 106, 107, 108, 110, 111

(56) References Cited

U.S. PATENT DOCUMENTS

| | | | | |
|---|---|---|---|---|
| 3,717,742 A | * | 2/1973 | Fottler | 219/85.13 |
| 4,121,044 A | * | 10/1978 | Hadersbeck et al. | 174/254 |
| 4,657,172 A | * | 4/1987 | Lee | 228/180.21 |
| 4,789,096 A | * | 12/1988 | Dunn et al. | 228/180.5 |
| 4,948,030 A | * | 8/1990 | Chason et al. | 228/118 |
| 5,098,008 A | * | 3/1992 | Viza et al. | 228/180.21 |
| 5,291,375 A | * | 3/1994 | Mukai | 361/760 |
| 5,367,192 A | * | 11/1994 | Massironi | 257/678 |
| 5,398,166 A | * | 3/1995 | Yonezawa et al. | 361/784 |
| 5,802,711 A | * | 9/1998 | Card et al. | 29/840 |
| 6,011,693 A | * | 1/2000 | Gore | 361/760 |
| 6,147,326 A | * | 11/2000 | Backlund | 219/243 |
| 6,612,023 B1 | * | 9/2003 | Lichtenwalter et al. | 29/840 |

* cited by examiner

Primary Examiner—Colleen P. Cooke
(74) Attorney, Agent, or Firm—Rosenberg, Klein & Lee (57) ABSTRACT

In a process of soldering an electric connector on a circuit board, the connector has an insulator and a plurality of leads mounted inside the insulator. Each lead has a first end extending into a soldering terminal to a bonding surface of the insulator. A soft solder paste is dispensed over a bonding surface of the circuit board. The soldering process inserts the soldering terminal of each lead in the soft solder paste and applies heat to the soft solder paste to bond the soldering terminal and the circuit board together. The direct insertion of the soldering terminal of the lead into the soft paste on the circuit board minimizes the contact area between the lead and the circuit board and prevents the solder paste from being unduly spread, causing short circuit. Furthermore, the yield and soldering reliability are increased and the production cost is reduced.

5 Claims, 8 Drawing Sheets

FIG. 12 the soldering terminal of the lead is directly inserted in the soft solder paste applying heat to the soft solder paste to bond the soldering terminal 48 and the circuit board 50 together

FIG. 13

PROCESS FOR SOLDERING ELECTRIC CONNECTOR ONTO CIRCUIT BOARD

BACKGROUND OF THE INVENTION

1. Field of the Invention

The invention relates to a process for soldering an electric connector onto a circuit board. More particularly, the invention relates to a process of soldering an electric connector onto a circuit board with increased yield and soldering reliability and reduced production cost.

2. Description of the Related Art

Bonding techniques used to attach an electric connector onto a circuit board include Direct Insertion Pin (DIP), Surface Mount Technology, and Ball Grid Array (BGA). However, these different bonding techniques may have some disadvantages.

Figure 1:
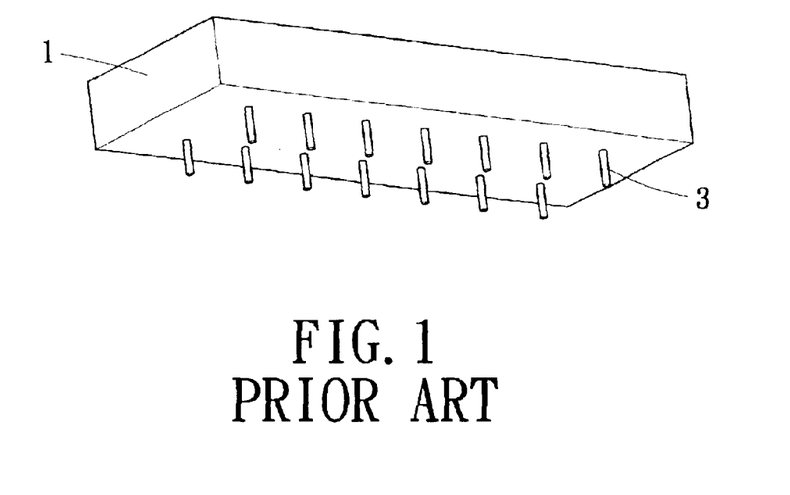
FIG. 1 is a perspective view of a conventional electric connector.
Figure 2:
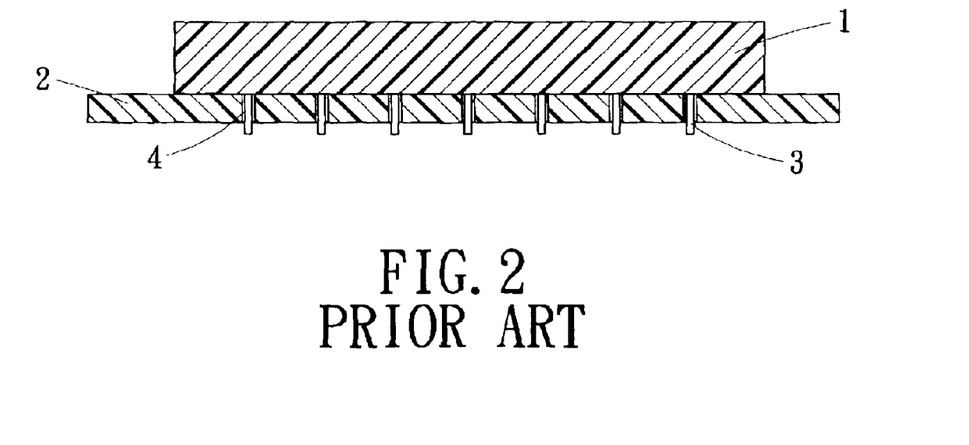
FIG. 2 is a cross-sectional view of a conventional electric connector connected to a circuit board.

Referring to FIG. 1 and FIG. 2, an electric connector 1 and a circuit board 2 are bonded to each other by the DIP technique. A plurality of leads 3 of the electric connector 1 respectively penetrate a plurality of through holes 4 of the circuit board 2 and then a solder paste is dispensed over the through holes 4, formed by drilling the circuit board 2. The through holes 4 adversely affect the high integrity of circuit design, especially in the case of multi-layered routing. Therefore, the size of the circuit board 2 and the electric connector 3 cannot be desirably reduced.

Figure 3:
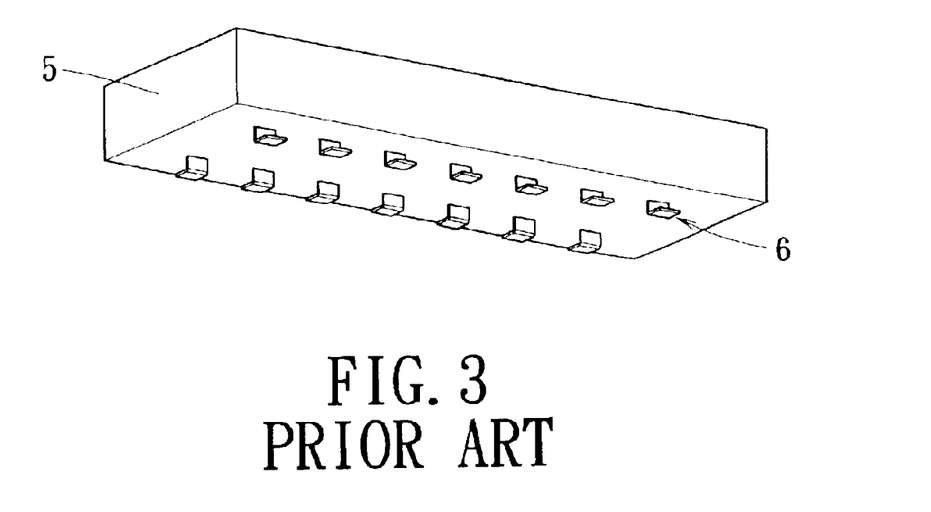
FIG. 3 is a perspective view of another conventional electric connector.
Figure 4:
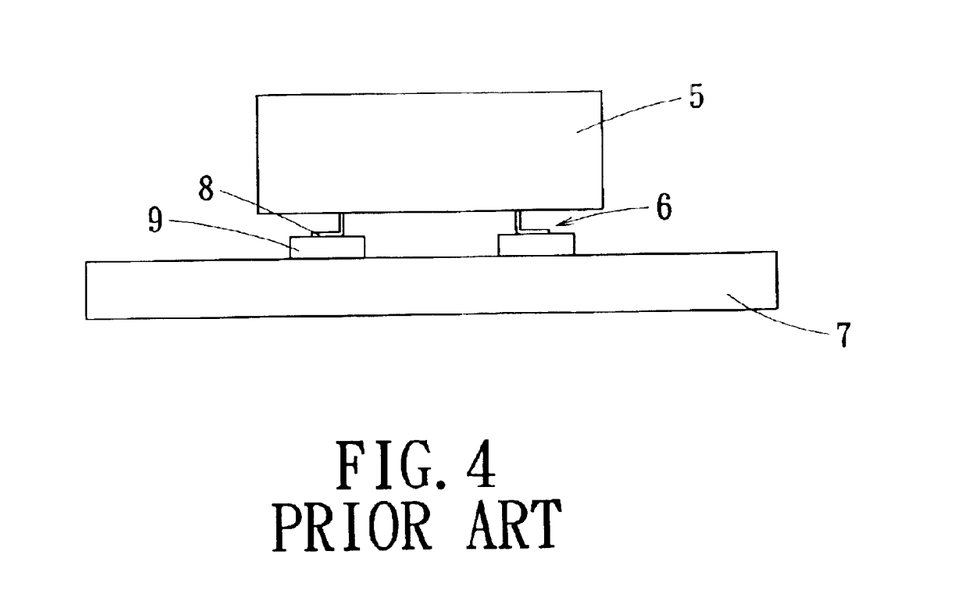
FIG. 4 is a cross-sectional view of another conventional electric connector connected to a circuit board.

Referring to FIG. 3 and FIG. 4, an electric connector 5 and a circuit board 7 are bonded to each other by SMT. Each lead 6 of the electric connector 5 is bent to form a contact portion 8 parallel to the circuit board 7. The contact portion 8 is attached to a solder paste 9 dispensed over the circuit board 7. An infrared radiation (IR) or hot air flow is used to bond the electric connector 5 to the circuit board 7. In SMT, a flux in the solder paste 9 removes an oxide layer on a top of each contact portion 8 facing the solder paste 9 when the soldering temperature exceeds about 150° C. As the temperature rises, the flux evaporates. At about 187° C., fine tin particles in the solder paste 9 begin melting and bond with the contact portions 8. One disadvantage of SMT is that when the circuit board 7 or the electric connector 5 is slightly bent or the contact portions 8 are not at the same level, some of the contact portions 8 cannot touch the solder paste 9. When the solder paste 9 is heated, these contact portions 8 are not dipped in a flux of the solder paste 9, which causes soldering defects. Furthermore, an oxide layer is often formed over the contact portions 8, which raises the whole resistance thereof and may even cause a soldering failure of the contact portions 8. The above disadvantages adversely affect the performance of the electric connector 5.

As the amount of leads on the electric connector increases, it becomes more difficult to control the yield. Therefore, a BGA bonding process is proposed.

Figure 5:
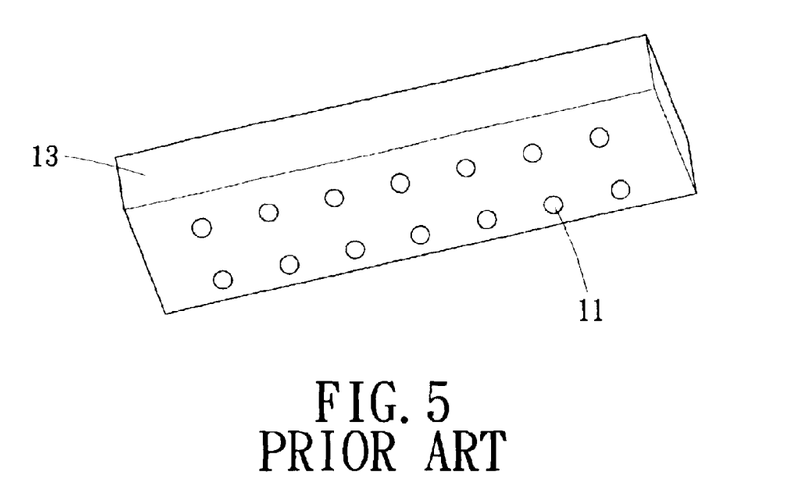
FIG. 5 is a perspective view of another conventional electric connector.
Figure 6:
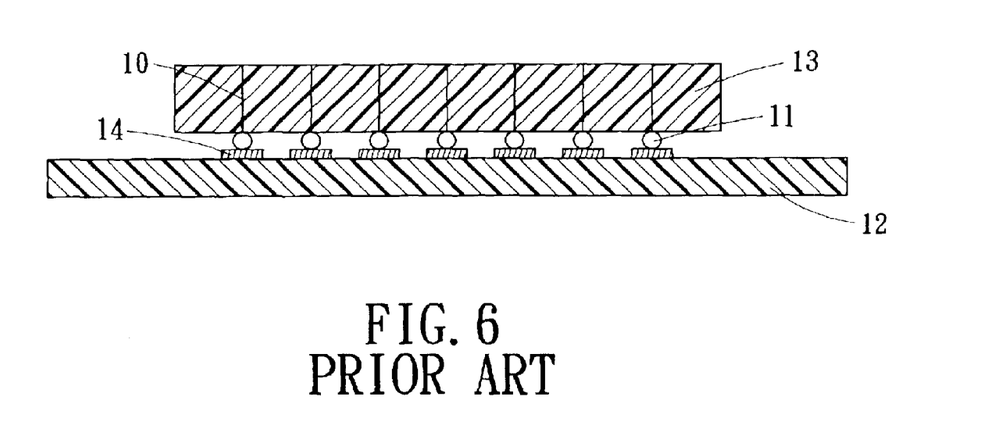
FIG. 6 is a cross-sectional view of another conventional electric connector connected to a circuit board.

Referring to FIG. 5 and FIG. 6, an electric connector 13 and a circuit board 12 are bonded to each other by BGA process. The solder ball 11 is placed on a terminal of each lead 10. During heating, if the circuit board 12 or the electric connector 13 is slightly bent or the solder balls 11 are not of a same height, the solder ball 11 at a higher level cannot be dipped in the flux within in a solder paste 14. On the other hand, the solder ball 11 at a lower level tends to be deformed after being heated. Deformation of the solder ball 11 lowers the overall position of the solder balls 11, which reduces soldering failure of the contacts portions. However, soldering the solder balls 11 on the terminals of the lead 10 needs is expensive and time-consuming.

In both SMT and BGA techniques, the respective contact areas of the solder paste and the circuit board are so large that the solder paste at the tip of each lead tends to spread out and contact with other solder paste areas, causing a short circuit.

SUMMARY OF INVENTION

It is therefore an object of the invention to provide a process for soldering an electric connector on a circuit board, which process increases yield and soldering reliability and reduces production cost.

In order to achieve the above and other objectives, a process for soldering an electric connector on a circuit board is provided. The connector includes an insulator and a plurality of leads mounted inside the insulator. Each lead has a first end extending into a soldering terminal to a bonding surface of the insulator. A soft solder paste is dispensed over a bonding surface of the circuit board. The soldering process includes the following steps: a) inserting the soldering terminal of each lead in the soft solder paste; and b) applying heat to the soft solder paste to bond the soldering terminal and the circuit board together.

The soldering terminal of the lead is directly inserted into the soft solder paste on. the circuit board and then fixedly bonded by heating. The circuit board therefore does not need to be drilled for external bonding to the electric connector. The direct insertion of the soldering terminal of the lead into the soft solder paste on the circuit board minimizes the contact area between the lead and the circuit board and prevents the solder paste from being unduly spread, which would cause a short circuit. Furthermore, the yield and soldering reliability are increased while the production cost is reduced.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Wherever possible in the following description, like reference numerals will refer to like elements and parts unless otherwise illustrated.

Figure 7:
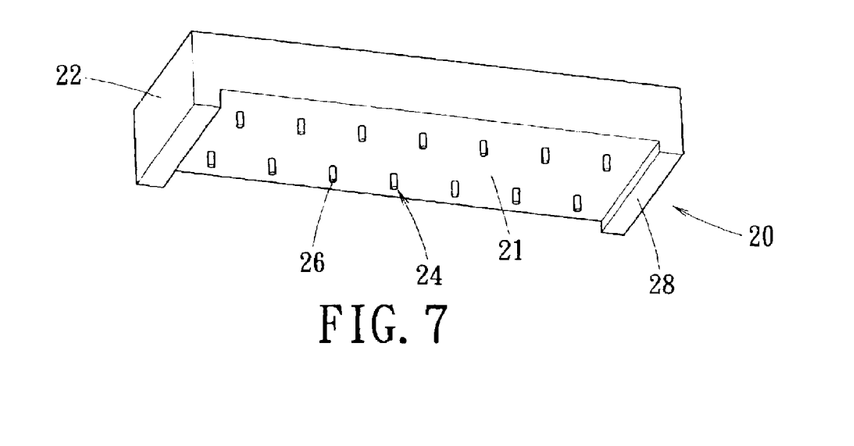
FIG. 7 is a perspective view of an electric connector according to a first embodiment of the invention.
Figure 8:
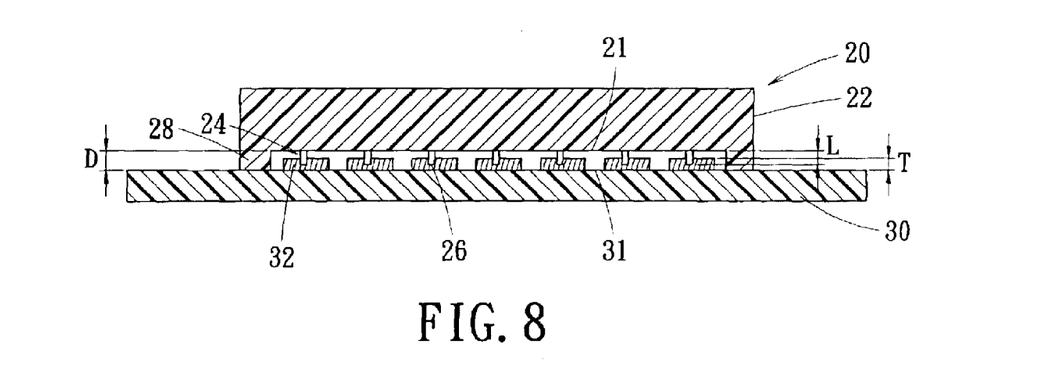
FIG. 8 is a cross-sectional view of an electric connector connected to a circuit board according to a first embodiment of the invention.

Referring to FIG. 7 and FIG. 8, the invention provides a process of soldering an electric connector on a circuit board. An electric connector 20 includes an insulator 22 and a plurality of leads 24 mounted inside the insulator 22. A first end of each lead 24 extends to a bonding surface 21 of the insulator 22 to form a soldering terminal 26. A soft solder paste 32 is dispensed over a bonding surface 31 of the circuit board 30.

Figure 13:
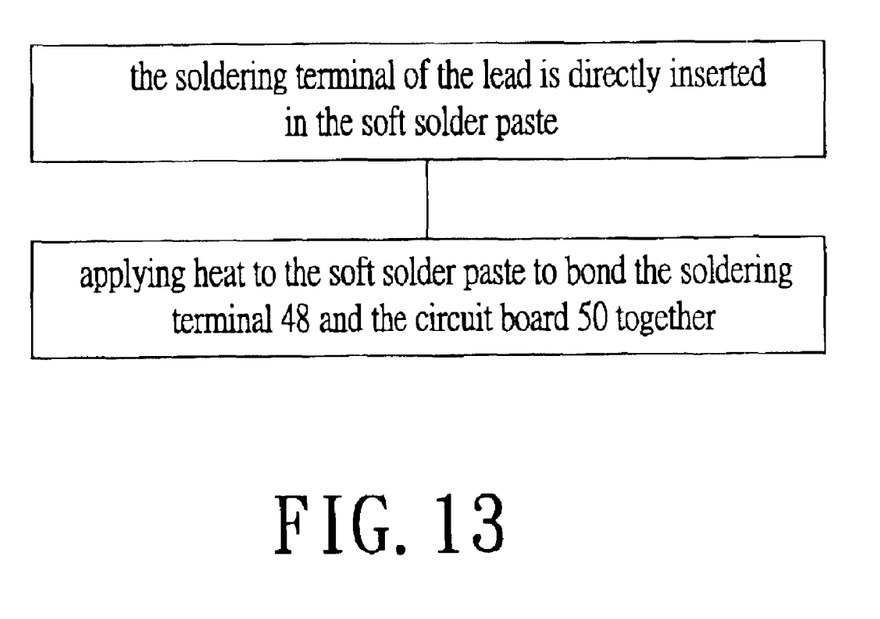
FIG. 13 is a flow chart of a process of soldering an electric connector on a circuit board according one embodiment of the invention.

Referring to FIG. 13, the process of soldering the leads 24 to the circuit board 30 includes the following steps: 1) inserting the soldering terminal 26 of each lead 24 into the soft solder paste 32, and 2) applying heat to the soft solder paste to bond the soldering terminal 26 and the circuit board 30 together.

Respective tips of the leads 24 are inserted into the soft solder paste 32 on the bonding surface 31 in a manner such that the soft solder paste 32 at the end of each lead 24 does not spread out and contact the soft solder paste 32 of adjacent leads 24. Therefore, an electric short circuit is prevented. Even if the electric connector 20 is slightly bent or the soldering terminals 26 of the leads 24 are not uniform in height, the soft solder paste 32 still has enough thickness T for encompassing an end of each lead 24, which prevents cold soldering. Compared with the current direct insertion operation, the size of the electric connector 20 therefore is favorably shrunk because the electric connector 20 is formed through drilling. Compared with the conventional surface mount technology (SMT), the soldering process of the invention increases the yield and the soldering reliability. Compared with the current ball grid array (BGA) process, the soldering process of the invention reduces the production cost while increasing the yield and the soldering reliability.

In order to further control the insertion depth of the soldering terminals 26 in the soft solder paste 32, a plurality of projections 28 is respectively formed at proper locations on the bonding surface 21 of the insulator 22. The projections 28 respectively have a thickness D greater than a length L of the solder terminal 26. The difference of height between bottom surfaces of each projection 28 and soldering terminal 26 is smaller than the height T of the soft solder paste 32 to ensure a good connection between the electric connector 20 and the circuit board 30 after the soft solder paste 32 is heated.

Figure 9:
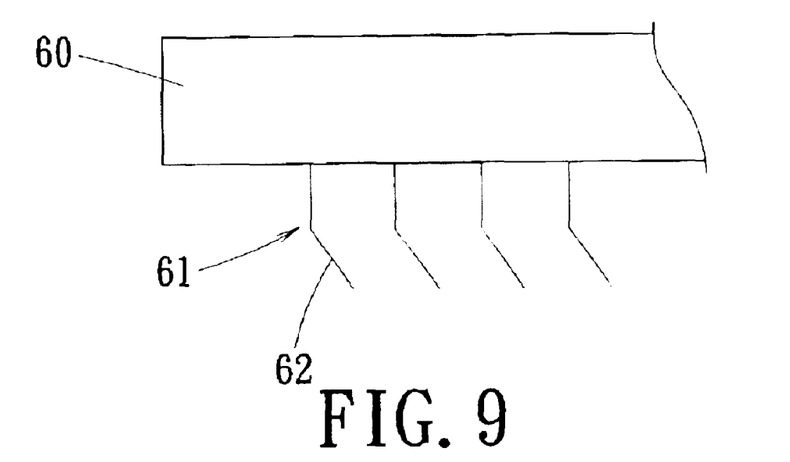
FIG. 9 is a schematic view of an electric connector connected to a circuit board according to a second embodiment of the invention.
Figure 10:
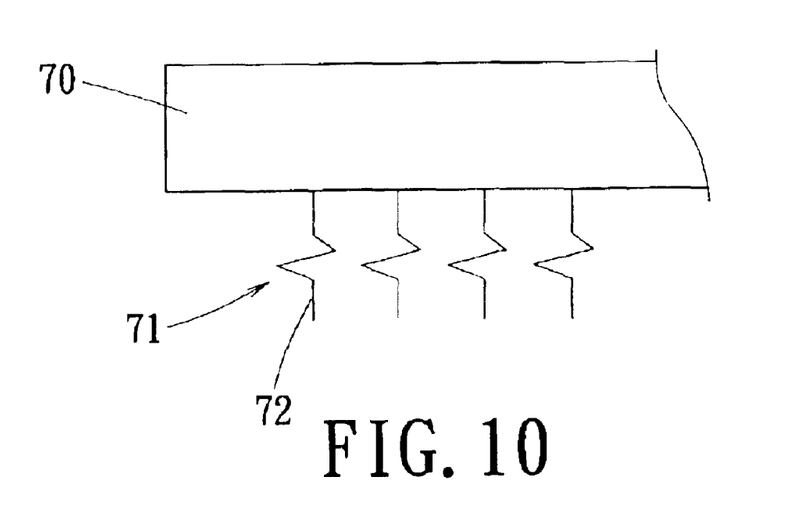
FIG. 10. is a schematic view of an electric connector connected to a circuit board according to a third embodiment of the invention.

Referring FIG. 9, according to another embodiment of the invention, a portion of a solder soldering terminal 62 of each lead 61 is bent at a certain angle. According to another variant embodiment of the invention, a portion of each lead 71 near its soldering terminal 72 is formed in a zigzag shape, as shown in FIG. 10, to provide a buffer effect after electric connectors 60, 70 have been bonded on a circuit board. This particular arrangement prevents electric disconnection of the leads from the circuit board due to shock or impact.

Figure 11:
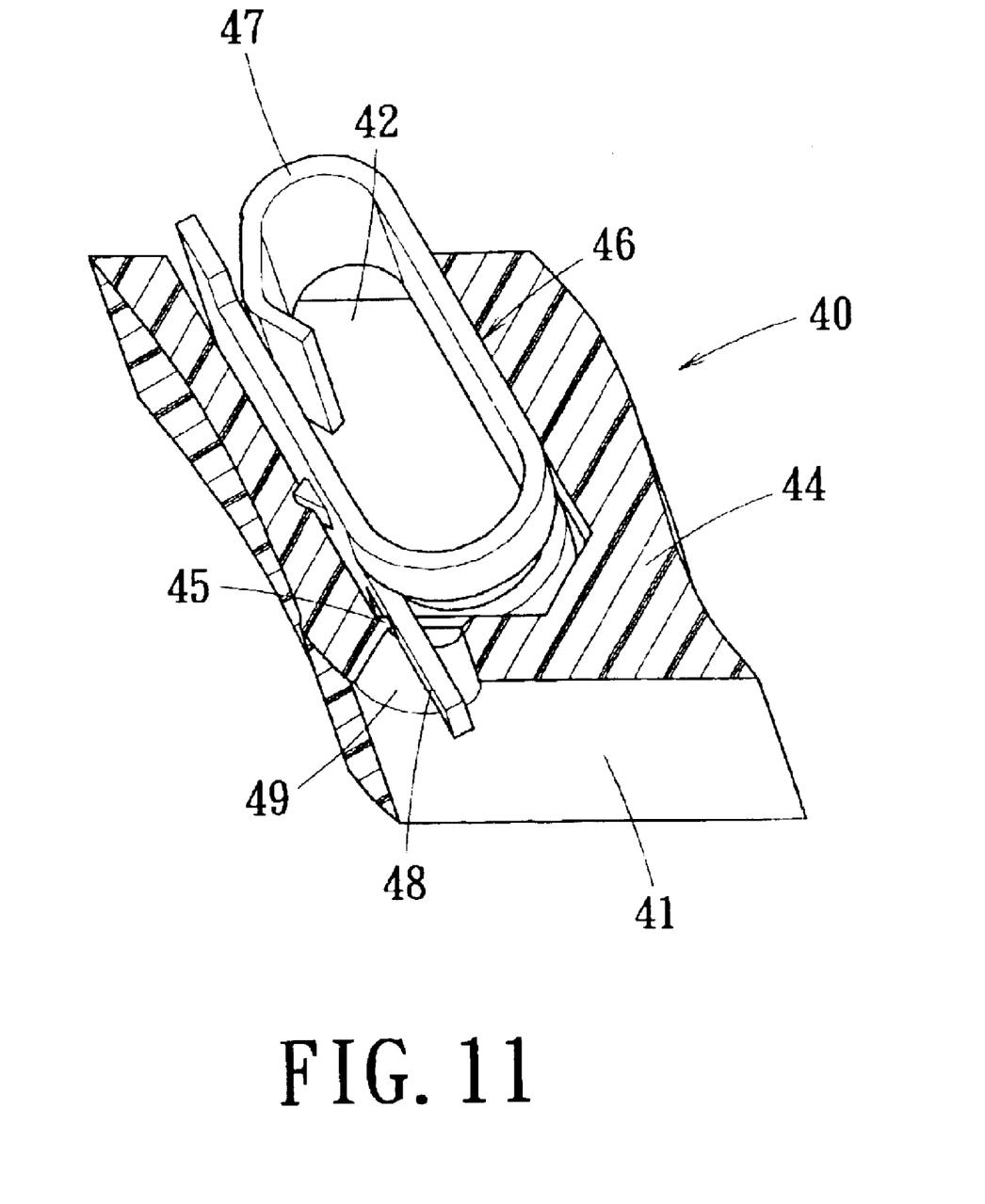
FIG. 11 is a partially enlarged cross-sectional view of an electric connector according to a fourth embodiment of the invention.
Figure 12:
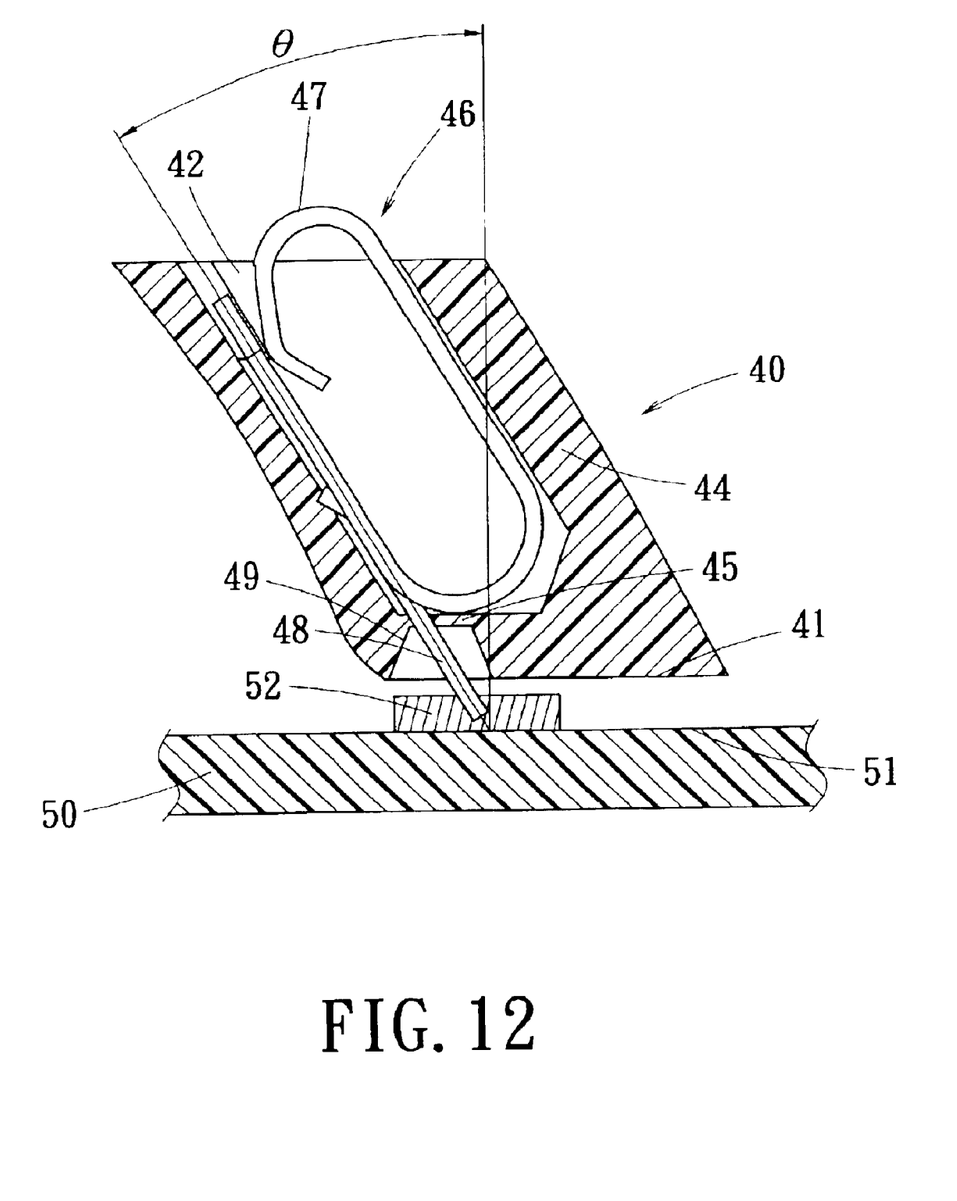
FIG. 12 is a partially enlarged cross-sectional view of an electric connector connected to a circuit board according to a fourth embodiment of the invention.

Referring to FIG. 11 and FIG. 12, an electric connector 40 includes an insulator 44 with a plurality of slots 42, and a plurality of leads 46 respectively received in the corresponding slots 42. A first end of each lead 46 has a contact portion 47 to connect an external electric component (not shown). A second end of each lead 46 extends through a bonding surface 41 of the insulator 44 to form a soldering terminal 48. A soft solder paste 52 is dispensed over a bonding surface 51 of a circuit board 50. FIG. 13 is a flow chart of a soldering process according to this embodiment of the invention. The process includes the following steps: 1) directly inserting the soldering terminal 48 of the lead 46 into the soft solder paste 52 at an angle θ, preferably less than 60°, from the normal line of the bonding surface 51 to enclose the portion of the insulator 44 near the soldering terminal 48; and 2) applying heat to the soft solder paste to bond the soldering terminal 48 and the circuit board 50 together.

A test result shows that when the soldering terminal 48 is tilted with respect to the normal line of the bonding surface 51 at an angle smaller than 60°, which is the angle between the normal line of the bonding surface 51 and the insertion direction of the solder terminal 48, the soft solder paste 52 of each lead does not excessively spread out and contact with other soft solder pastes 52. Therefore, a short circuit is prevented. The insulator is further provided with a spacer 45 forming an opening near the soldering terminal 48. A cross section of the lead near the spacer 45 is smaller than the opening of the spacer 45 that, thereby, can accommodate the lead 46 to separate the slot 42 into two parts. The spacer 45 helps the solder paste 52 enclose the portion of the insulator 44 near the soldering terminal 48. Thereby, the soldering paste 52 between the soldering terminal 48 and the circuit board 50 is prevented from being lost due to siphonage, which would impair the bond strength. A dam block 49 further protrudes from the bonding surface 41 of the insulator 44, around each soldering terminal 48. The soft solder paste 52 fastens a part of the soldering terminal 48 to the darn block 49, ensuring a good bond between the electric connector 40 and the circuit board 50.

Although the invention is exemplified by the above embodiments, the soldering process of the invention can be applied to any bonding process for electronic devices, which those skilled in the art will understand through the above description.

In view of foregoing, the soldering process of the invention has the following advantages.

The soldering terminal of the lead is directly inserted into the soft solder paste on the circuit board and then attached by heating. The circuit board therefore does not need to be drilled for external bonding to the electric connector. The direct insertion of the soldering terminal of the lead in the soft paste on the circuit board minimizes the contact area between the lead and the circuit board and prevents the solder paste from being unduly spread, causing a short circuit. Furthermore, the bonding of the soldering terminal to the circuit board by insertion into the soft solder paste increases the yield and soldering reliability and reduces the production cost.

It should be apparent to those skilled in the art that the above description is only illustrative of specific embodiments and examples of the invention. The invention should therefore cover various modifications and variations made to the herein-described structure and operations of the invention, provided they fall within the scope of the invention is defined in the following appended claims.

What is claimed is:

1. A process of soldering an electric connector on a circuit board, the connector comprising an insulator and a plurality of leads mounted inside the insulator, each lead having a first end extending into a soldering terminal to a bonding surface of the insulator, and a soft solder paste being dispensed over a bonding surface of the circuit board, the process comprising:

a) inserting the soldering terminal of each lead in the soft solder paste at an angle θ greater than zero and smaller than about 60° from a normal line of the bonding surface to enclose a portion of the insulator near the soldering terminal; and b) applying heat to the soft solder paste to bond the soldering terminal and the circuit board.

2. The process of claim 1, wherein the insulator at step a) is further provided with a spacer near the soldering terminal to help the soft solder paste enclose the portion of the insulator near the soldering terminal.

3. The process of claim 1, wherein at step a), a plurality of projections is respectively formed on the bonding surface of the insulator, the projections respectively having a thickness greater than a length of the solder terminal, a difference of height between a bottom surface of each projection and a bottom surface of each soldering terminal being smaller than a height T of the soft solder paste.

4. The process of claim 1, wherein at step b), a dam block further protrudes from the bonding surface of the insulator and around each soldering terminal, and the soft solder paste bonds a part of the soldering terminal to the dam block.

5. The process of claim 1, wherein at step a), a portion of the soldering terminal is bent at an angle.

* * * * *